Feb. 24, 1931.    J. E. THORNTON    1,794,043
PRINTING AND PRODUCING DOUBLE WIDTH POSITIVE FILM STRIPS
Filed Oct. 24, 1927

INVENTOR.
J. E. Thornton
by Howden O'Brien
Atty

Patented Feb. 24, 1931

1,794,043

UNITED STATES PATENT OFFICE

JOHN EDWARD THORNTON, OF ST. BRELADE, JERSEY, CHANNEL ISLANDS, ASSIGNOR TO JOHN OWDEN O'BRIEN, OF MANCHESTER, ENGLAND

PRINTING AND PRODUCING DOUBLE-WIDTH POSITIVE FILM STRIPS

Application filed October 24, 1927. Serial No. 228,438.

This invention relates to a method and process for printing and producing positive kinematograph or other picture films having picture-components in pairs in direct succeeding order, upon a double-width strip of film or upon two single-width films, from a single-width negative-strip or cliché upon which the pairs are formed each with their two components arranged in alternating order.

*The alternative-negative single-width strip*

The single-width negative-strip A is of the usual type, comprising a transparent support of celluloid or the like and a sensitive layer of rapid gelatino-silver-bromide-emulsion, preferably panchromatized, and attached to the support by the usual adhesive substratum.

*The double-width positive strip*

The pairs of consecutive prints can be made in various types for various purposes, including the following:—

(1) As a pair of printing-clichés (of either negative or positive character) for use in producing further copies.

(2) As a pair of positive components upon film material of half-standard thickness, the two strips being subsequently superimposed and cemented together either back-to-back, face-to-face, or face-to-back; the positives being either two-ply two-color pictures, or two-ply one-color (monochrome) pictures, or two-ply three or four color pictures.

(3) As a pair of positives of non-colored material, the images of which have to be colored by dyes after printing, and as complementary pairs, one in orange-red and the other in blue-green.

(4) As a pair of positives upon ready-colored film-material, the images being completed in colors by development alone without any dye treatment afterwards and as complementary pairs of orange-red and blue-green.

The double-width strip comprises a transparent support of celluloid or the like having a sensitized layer attached to one side by a suitable adhesive substratum and sensitized according to any known method with silver or bichromate salts.

According to the invention the film is printed or produced with parallel rows of pairs of component images those in each row in consecutive sequence, from a negative or printing cliché of single-width upon which the pairs of complementary component images are arranged in alternating order, by exposing a picture-component in one row through the corresponding complementary image of the negative film, turning the negative strip over in a loop or curl upon and exposing a picture component in the other row through the other complementary image of the negative film the apertures through which the exposures are made being arranged one in advance of the other and one over each of the rows.

The invention is illustrated by the accompanying drawings in which:—

Figure 1:
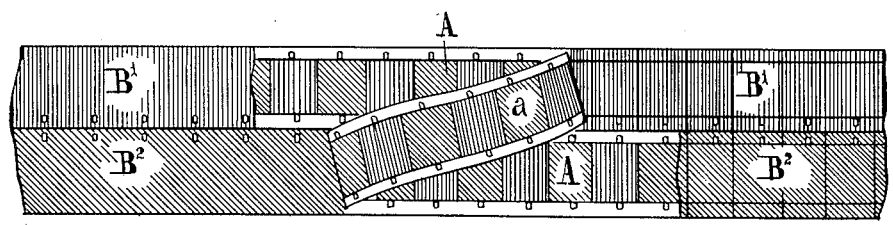
Fig. 1 is a diagrammatic plan of the single-width negative-film and double-width positive-film in the position for printing.
Figure 2:
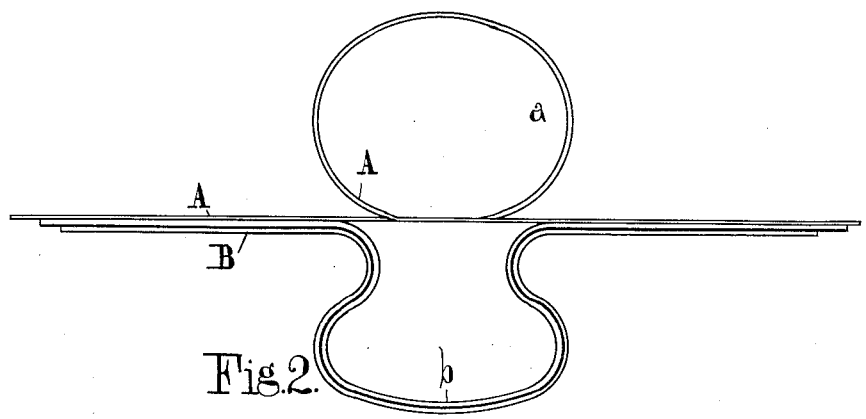
Fig. 2 is a longitudinal section of same.

The strip may be provided with a detachable temporary reinforcing strip of paper cemented during the manufacture of the film to its sensitized side when required for the production of relief images, or cemented to its celluloid side when required for the production of nonrelief images.

*Printing the positive and apparatus therefor*

The sensitive double-width positive film-material (or pair of single-width strips) is passed through a printing apparatus having two printing positions, each defined by the known printing mask C (Fig. 3) one of such printing-positions centering upon that half $B^1$ of the film which corresponds to one set of section-pictures in the case of a film colored orange-red, and the other printing position centering upon the other half $B^2$ of the film which corresponds to the other set of section-pictures in the case of a film colored blue-green. In the further description of the invention the two parts $B^1$ and $B^2$ of the film will be referred to, for the sake of clearness, as the half corresponding to the orange-red and the half corresponding to the blue-green, of a two-ply, two-color positive film, although it is to be understood that the invention may be applied for printing and producing any type of picture-components in pairs as set forth in the opening paragraph of the specification.

The printing position $c^1$ for the half $B^1$ is placed several picture-spaces forward of the position $c^2$ for the half $B^2$ and between these two picture-spaces the positive-film-material $B^2$ to be printed is formed into a slack-loop $b$.

The single-width negative-film A of alternating components is threaded into the printing machine in such manner that the orange-red-sensation negative No. 1 first meets the forward end of the half $B^1$ of the positive-film corresponding to No. 1 orange-red stripe, and the first component image is printed by admitting light through the negative on to the sensitive film.

The apparatus is of the known intermittent type, with the usual feed sprockets, feed-claws, registration-pegs, and other details duplicated where necessary, and after this first exposure it moves one working stroke which moves the double-width sensitive positive-film (or pair of single-width positives) one picture-space forward, but the single-width alternating negative-strip is simultaneously moved two picture-spaces forward. A further exposure is then made which imprints No. 2 positive corresponding to the orange-red by making exposure through No. 2 orange-red negative. The operations are repeated step-by-step, with the result that all the orange-red pictures are selected from the alternating negative and impressions are made in direct (non-alternating) sequence upon the orange-red portion $B^1$ of the double-width strip; or equivalent pair of single-width strips.

As the single-width negative A advances, and after it has passed the printing-position $c^1$ at which all exposures for orange-red are made, the negative-strip makes a complete loop $a$ in the shape of a twist or curl, which has the effect of transferring the negative-film from the orange-red stripe $B^1$ to the blue-green stripe B, and thus centering it at the second printing-position $c^2$ over the blue-green half $B^2$ of the sensitive positive-film. Exposures of the blue-green component pictures are then made in sequence as already described, and when they have all been printed the picture-spaces will have been filled with two parallel rows of consecutive component pictures, each row being of a different color.

The object of the plain-loop $b$ in the sensitive positive-film $B^1$, $B^2$ and the curl-loop $a$ in the negative film A is to provide compensation and bring the picture-components to their correct positions, and a further object of the curl or twist $a$ of the negative film is to enable it to easily cross over from one stripe to the other without distortion of the negative.

In describing this loop the negative film may also be arranged to turn over or not in order to print from either side of the negative, according to whether one of the component images requires to be reversed or not in relation to the other component image.

A feature of the process is that the two picture-components shall be separately registered during exposure, the orange-red negative and positive-film being registered upon one pin at one exposure-opening, and the blue-green negative and positive-film registered upon another pin at the other exposure-opening. The slack and loop of each film allowing the two films to freely assemble on the two pins at the two printing-points, which would not be possible without the slack and loop.

The printing light may be of any suitable source of illumination, but it is essential that it shall be suitably divided to apply to both printing-positions and masks, which are each some distance from the other and each in a different track.

This result may be attained in various ways, for example, one lamp or light-source may be used and the light emerging therefrom may be divided by prisms or reflectors into two light-beams, one of which is directed to one printing-position and the other beam to the other printing-position.

Figure 3:
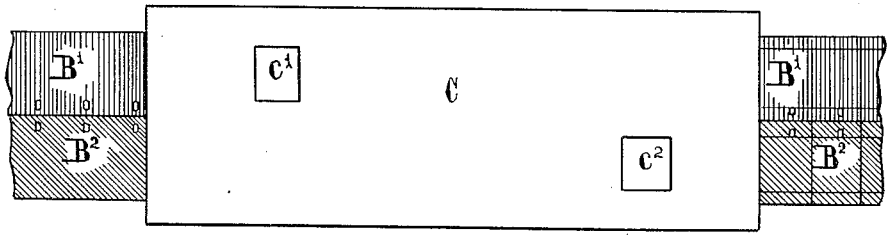
Fig. 3 is a plan showing a solid metal plate or printing mask as employed for the projection system of printing.

The printing may be performed by the projection system in which a single mask C with printing apertures $c^1$ and $c^2$ is employed as shown in Fig. 3. Or it may be performed by the contact system in which the mask is divided into two with a space between each part for the loop or curl $a$ of the negative film A.

The solid metal plate or printing mask C shown in Fig. 3 entirely covers the sensitive film and protects it from light except at the two exposure openings $c^1$ and $c^2$ cut in the plate.

The sensitized ready-colored double-width film $B^1$, $B^2$ enters the printing machine at one end, is drawn under the plate C by the step-feed mechanism in the direction of the arrow, one picture-space at each feed stroke and passes out at the other end with side-by-side exposed pictures.

The light for printing the orange-red stripe passes through the opening $c^1$ and for printing the blue-green stripe passes through the opening $c^2$.

The alternating negative film is arranged above or in front of the masking plate C and is moved forward two printing spaces at each feed stroke.

A lens is arranged in each exposure opening $c^1$ and $c^2$ between the negative and the double-width positive film.

Figure 4:
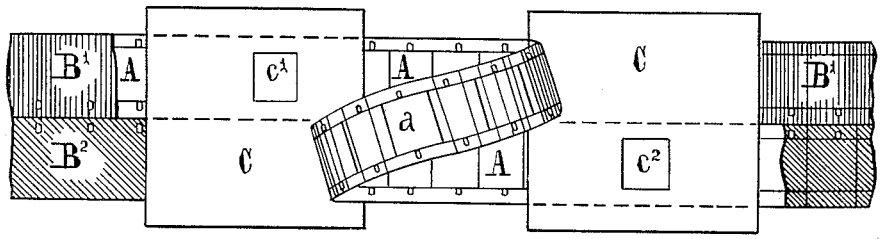
Fig. 4 is a plan showing the printing mask divided into two as employed for the contact system of printing.

For the contact system of printing, the negative film and the positive double-width film both pass under the masking plate C which is formed in two parts as shown in Fig. 4 with a space between them for the loop or curl of the negative film where it crosses over from the orange-red to the blue-green stripe.

In both forms of the apparatus, printing guides may be employed to maintain the films and loops in correct relative positions, and track guides are also formed for each loop so that the size of the loop in each of the films will always be maintained at a constant size.

The subsequent operations of developing, treating, and finishing are suited to the particular sensitizing process adopted, and the surface may be varnished in known manner.

After the whole of the printing and finishing operations have been completed and the two strips have been cemented together, the united strip is passed through a perforating machine which punches the complete set of eight holes per picture for traction purposes, four in each margin (or any other number to a set) using the hole already made as a pilot hole from which to work in positioning the remaining holes. This pilot hole may form one of the set of eight.

The two-color positive film is now complete and ready for exhibiting.

The original alternating negatives on the single-width strip may have both component negatives of a pair made to face the same way, or one of them may have its image reversed in relation to the other component.

As both images are simultaneously photographed together through a light-splitting device, either of these different arrangements of the negatives is secured by suitable design of the light-splitting device.

The two component images printed side-by-side upon the double-width positive film may have both images facing the same way, in order that when the film has been slit into two the two components may be cemented together back-to-face.

Or they may instead be printed side-by-side with one image reversed in relation to the other, in order that the two component films may be cemented either back-to-back or face-to-face.

These positions of the images upon the double-width positive can be determined either by the position of the images upon the single-width negative or by the particular way of turning or twisting the single-width negative strip after the first component has been printed upon the double-width strip and before the second component is printed.

What I claim as my invention and desire to protect by Letters Patent is:—

1. A method of printing two parallel rows of complementary kinematograph color pictures from a single-width negative alternating complementary color film on to a double-width sensitive material, which consists in passing the sensitive double width material through a printing mask, exposing one picture area in one half of the double width to a component image on the negative and at the same time exposing a further component image on the second half of the double width film, to a complementary component image on the negative, a curl loop being formed in the negative film between the two exposure openings to allow said film to twist from one half width to the other, and a plain loop in the double width film the distance between the simultaneous exposures in both widths being regulated by the length of the loops to ensure that complementary section images of the same picture, one in each longitudinal row, occupy picture spaces in the same transverse row.

2. A method of printing two parallel rows of complementary kinematograph color pictures from a single width negative alternating complementary color film on to a double width half standard thickness sensitive positive material which consists in passing the sensitive double width positive material through a printing mask exposing one picture area in one half of the double width to a component image on the negative and at the same time exposing a further component image on the second half of the double width film to a complementary component image on the negative a curl loop being formed in the negative film between the two exposure openings to allow said film to twist from one half width to the other and a plain loop in the double width film the distance between the simultaneous exposures in both widths being regulated by the length of the loops to ensure that complementary section images of the same picture, one in each longitudinal row occupy picture spaces in the same transverse row and then cementing the two half widths together to give a positive film of standard width and thickness.

3. Apparatus for printing two parallel rows of complementary kinematograph color pictures from a single width, negative, alternating, complementary color film on to a double width half standard thickness sensitive positive material comprising a negative, single width alternating complementary color film, a double width positive film and a printing mask having two exposure openings arranged one in advance of the other and one over each row of picture areas in the double width film, a curl loop being formed in the negative film between the two exposure openings to allow said film to twist from one half width to the other and a plain loop in the double width film the distance between the simultaneous exposures in both widths being regulated by the length of the loops to ensure that complementary section images of the same picture, one in each longitudinal row occupy picture spaces in the same transverse row.

In testimony whereof I have hereunto set my hand.

JOHN EDWARD THORNTON.